United States Patent [19]

Howe et al.

[11] Patent Number: 4,943,750
[45] Date of Patent: Jul. 24, 1990

[54] ELECTROSTATIC MICROMOTOR

[75] Inventors: Roger T. Howe, Belmont; Jeffrey H. Lang, Waltham; Martin F. Schlecht, Lexington; Martin A. Schmidt, Brookline; Stephen D. Senturia, Boston, all of Mass.

[73] Assignee: Massachusetts Institute of Technology, Cambridge, Mass.

[21] Appl. No.: 376,208

[22] Filed: Jul. 3, 1989

Related U.S. Application Data

[63] Continuation of Ser. No. 52,725, May 20, 1987, abandoned.

[51] Int. Cl.$^5$ ............................................. H01L 41/08
[52] U.S. Cl. ................................... 310/309; 310/42; 310/90.5
[58] Field of Search ..................... 310/309, 42, 90.5

[56] References Cited

U.S. PATENT DOCUMENTS

| | | | |
|---|---|---|---|
| 4,789,803 | 12/1988 | Jacobsen et al. | 310/309 |
| 4,814,657 | 3/1989 | Yano et al. | 310/309 |

FOREIGN PATENT DOCUMENTS

| | | | |
|---|---|---|---|
| 137622 | 8/1946 | Australia | 310/309 |
| 0136979 | 6/1988 | Japan | 310/309 |
| 0136980 | 6/1988 | Japan | 310/309 |
| 0001488 | 1/1989 | Japan | 310/309 |

Primary Examiner—Mark O. Budd
Attorney, Agent, or Firm—Hamilton, Brook, Smith & Reynolds

[57] ABSTRACT

An electrostatically driven microactuator is micromachined in a monolithic process. Sacrificial layers are placed between a moving element and stator structural layers. Removal of the sacrificial layers leaves a free standing moving element and micron wide air gaps within a stator. An electric field of about 100 Mv/m and higher is supported across the micron wide gap without breakdown and enables high energy torque densities to be produced between the stator and the moving element. One electrostatic drive scheme involves a series of stator electrodes attached to the stator and a series of electrodes attached to the moving element charged in sequence to attract each other in a direction of movement and to oppose each other in a direction normal to movement. A bearing is aligned with the moving element with the stator during the layering of a sacrificial layer over an edge of the moving element structural layer. The bearing and stator laterally stabilize the moving element. Vertical stability is through aerodynamic shaping of the moving element, electronic circuits, or bushings. Applications of the microactuator include a linearly sliding shutter, an optical modulator, a gyroscope and an air pump.

27 Claims, 9 Drawing Sheets

ELECTROSTATIC MICROMOTOR

This is a continuation of co-pending application Ser. No. 07/052,725 filed on May 20, 1987 now abandoned.

BACKGROUND OF THE INVENTION

Microsensor technology has rapidly developed over the past decade. There are silicon microsensor chips that sense mechanical variables such as acceleration. There is a microsensor, the silicon diaphragm pressure sensor, which as its name implies measures pressure and is now manufactured in quantities of several million per year. Chemical sensors have also been fabricated on silicon substrates to sense ion concentration, dielectric properties of materials, organic vapor concentrations, and gas concentration, etc.

However, existing microstructures, such as diaphragms and microbridges, used in these microsensors are usually unable to move in any direction and those which are able to move do so only a few micrometers in a direction perpendicular to the plane of the substrate. The limited travel, coupled with the rather small forces that can be applied to deflect the structure, have discouraged development of a microactuator technology. The few existing microactuators are for special applications where small displacements are sufficient. These include a micromachined crosspoint switching array, a microvalve for a wafer-scale gas chromatograph, and a piezoelectrically pumped cavity for an ink-jet printer. There are no microfabricated actuators in which a microstructure executes unrestrained macroscopic motion. Further, most microsensors are based on chemical processes for fabricating micromechanical structures on silicon substrates. These special micromachining techniques include etching of the silicon wafer (substrate micromachining) and selective etching of multilayer thin film sandwiches (surface micromachining) which are not compatible with the materials of most existing actuators.

There are basically two types of actuators, electric and magnetic. These two types are generally referred to herein as electroquasistatic (EQS) and magnetoquasistatic (MQS) actuators, respectively. Conventionally, MQS actuators are preferred over EQS actuators due to the former having larger energy and torque densities when limited by the physical and practical constraints of conventionally sized and fabricated actuators.

Neither EQS nor MQS actuators used for large scale, macro systems are easily scaled down to apply to micro scaled devices. For example, macroscopic MQS actuators follow Ampere's Law where the line integral of the magnetic field H around a closed path $\int H.dL$ is equal to $\mu. \int J.dA$ where J is the current density through the area A bounded by the path. As an MQS actuator is scaled down in size, the integrated area, A, decreases more rapidly than the integrated length, L, and it becomes difficult to obtain the current density J needed to produce the same magnetic field H. That is, for constant H, hence constant energy density and torque density, the current density J, and hence energy dissipation density, must increase. On the other hand, EQS actuators in macro systems require high voltages which are limited by the breakdown voltage of air or the gas in which the motor operates. Further, EQS actuators require mechanical accuracies such as very smooth surfaces. Otherwise, electric field concentration at asperities on the electrode surface induce localized field emission or corona-discharge at very low average electric fields and thus further limit the electric field strength. Such limitations similarly present difficulties in the application of electrostatic actuators to micro systems.

SUMMARY OF THE INVENTION

The present invention provides a microactuator with an EQS drive. The actuator is referred to as a motor. Applicants have found that micromachining techniques enable the making of small gaps and very smooth surfaces which overcome voltage breakdown of the electroquasistatic field and localized field emission problems of the past. This in turn enables the generation of high electric fields and high torque densities which form large actuating forces.

The present invention comprises a moving member, such as a plate or a rotor, positioned within a stator such that a small gap is formed between the moving member and the stator. The distance between the moving member and the stator across the gap is on the order of about one micrometer which is sufficiently small to support voltages up to about 100 volts without breakdown. An electrostatic field is generated across the gap and moves the moving member within the stator.

The moving member, stator and small gap are microfabricated through a monolithic process. A first sacrificial layer is deposited onto a substrate. A structural film is deposited over the first sacrificial layer to form the moving member. A second sacrificial layer is placed over the moving member and covers an edge of the moving member. A second structural layer is deposited over the second sacrificial layer and along the edge of the moving member, and is connected to the substrate to form the stator. The sacrificial layers are removed to free the moving member within the stator.

In accordance with the present invention, a bearing is formed between the stator and the moving member. The bearing is aligned with the moving member by another sacrificial layer being deposited over the moving member and one of its edges. The second structural layer is then placed over the sacrificial layer along the edge of the moving member and connected to the substrate to form a self-aligned bearing.

In one embodiment a center bearing is formed and aligned with a rotor within the stator. A first structural layer covers a first sacrificial layer deposited over a substrate. A second sacrificial layer is placed over the first structural layer. The rotor with a circular center opening is patterned in the first structural layer through the second and first sacrificial layers. A third sacrificial layer covers the formed rotor, edges of the center opening and outer edges of the rotor. A second structural layer is deposited over the sacrificial layers and rotor along the outer edges and the edge of the center opening. The second structural layer is connected to the substrate within the center opening of the rotor to form the center bearing and is connected to the substrate to the outside of the rotor to form the stator. The sacrificial layers are removed and leave a free standing rotor within a stator with a center bearing for limiting lateral movement of the rotor. Optionally, the center bearing alone may serve as a stator such that the rotor has an exposed outer edge. The exposed outer edge allows for mechanical applications of the rotor.

In accordance with another aspect of the invention, the stator includes a series of stator electrode segments on each side of the moving member. The moving member includes a series of electrically connected electrode segments. The electrodes of one of the series of electrode segments are charged in sequence, inducing charges on the electrodes of the other series of electrode segments that result in an attractive force. The attraction toward each side of the moving member is complementary in a direction of moving member movement and in opposition in a direction normal to the direction of movement.

In one design of the invention, a variable capacitance scheme is used to sequentially charge stator electrodes on opposite sides of the moving member and to oppositely charge electrodes of the moving member in sequence. However, various analogs to MQS motors are suitable. For example, the variable capacitance motor of the one design is the analog of a variable reluctance MQS motor. Also, the sequential charging of the series of moving member electrode segments may be accomplished by a set of charging and discharging brushes or other means.

The attraction in a direction normal to the direction of movement aids in the levitation of the moving member. The normal direction attraction between the stator electrodes on one side of the moving member and the respective moving member electrodes is in an opposite direction to the normally directed attraction between the stator electrodes on the opposite side of the moving member and the respective moving member electrodes. Hence, attraction in a normal direction is balanced between the opposite sides of the moving member. Slight differences in these attractions can be used to control the levitation of the moving member. In one design of the invention, an electronic circuit is used to sense and correct the vertical position of the moving member relative to the stator. Aerodynamic shaping of the moving member may also be used to levitate the moving member. Without active means of levitation, bushings positioned under the moving member may be used to off-set the moving member from the substrate.

In one application of the invention, the micromotor can be used as an optical modulator. The rotor comprises alternating opaque and transparent regions. A thin transparent diaphragm is micromachined into the substrate underneath a portion of the rotor. A light beam from an adjacent source passes through the diaphragm and is modulated by the rotating rotor having the alternating opaque and transparent regions. The opaque regions in one embodiment are defined by extensions of the rotor electrodes.

In another application of the invention the micromotor can be used as a gyroscope. In this case, active stabilization of the rotor provides means for detecting the torques exerted on the rotor due to changes in substrate orientation.

In accordance with another feature of the present invention, the micromotor can also be used as an air pump. An aperture underlying the rotor at some radius is micromachined into the substrate. Apertures at a corresponding radius are micromachined in the rotor. A pressure differential arises from the velocity of air at the rotor surface being greater than that of the air at the substrate when the rotor is in motion. This creates a suction of air through the apertures in the rotor when the rotor is rapidly spinning about the bearing, and thus provides an air pump.

In another embodiment of the invention, the moving element is driven laterally over the substrate in a guiding track. The track comprises a plurality of electrodes in the substrate and a matching plurality of electrodes held above the moving element in line with the substrate electrodes. The electrodes attached on top of and below the outer edge of the moving element are also in line with the track electrodes. A synchronous phasing of the track electrodes generates a series of electric fields at the outer edge of the moving element which are timed so as to pull the moving element along the track over the substrate. Further, the track may lead to an aperture in the substrate. The moving element pulled to the end of the track then covers the aperture and forms a shutter for the aperture.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different reviews. The drawings are not necessarily to scale, emphasis instead being placed upon illustrating the principles of the invention.

FIG. 7 is a schematic of the electrical circuit used to drive the microactuators of FIGS. 2-4.

FIGS. 8a-8e is an illustration of the self-aligned bearing fabrication process of a micromotor embodying the present invention.

DETAILED DESCRIPTION OF THE PREFERRED EMBODIMENTS

Figure 1:
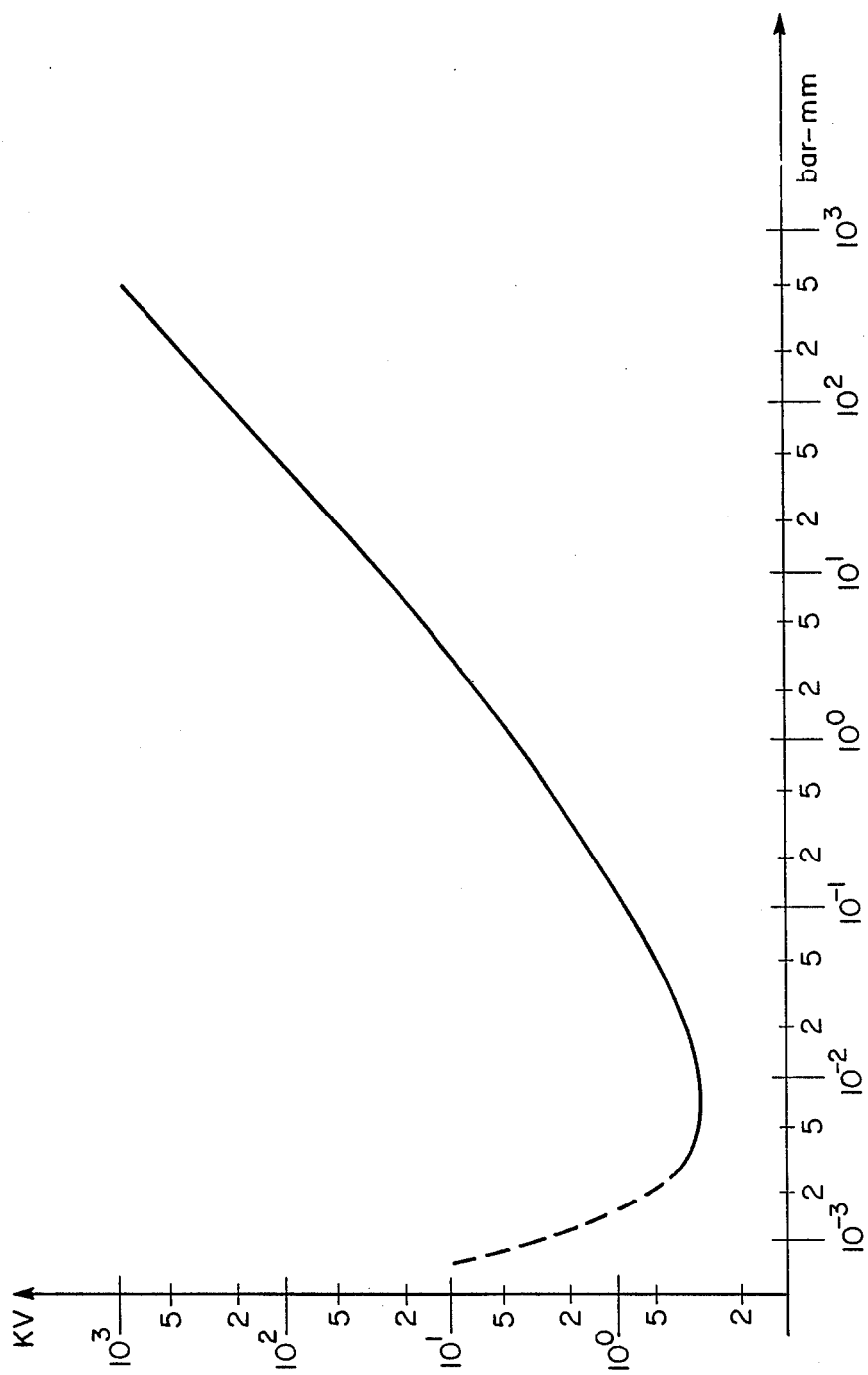
FIG. 1 is the Paschen curve for air at 20° centigrade.
Figure 2A:
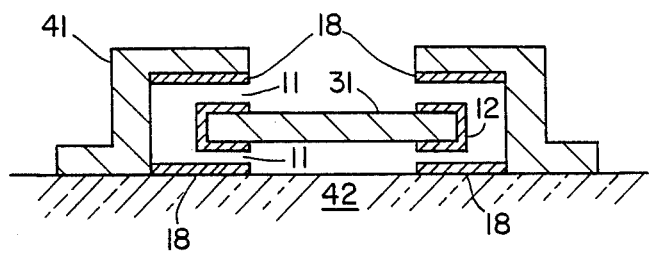
FIGS. 2a-2c are a cross section and plan views respectively of a microactuator embodying the present invention.
Figure 2B:
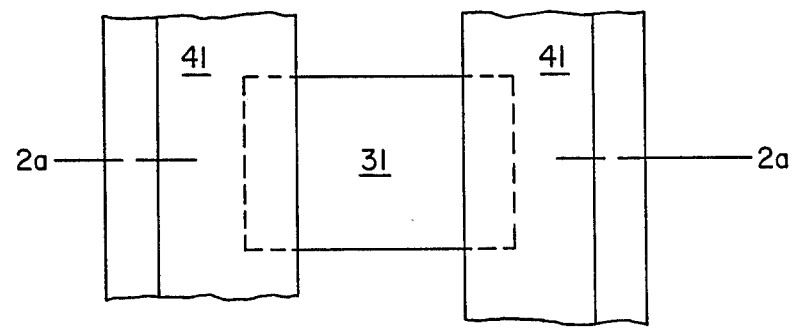
Figure 2C:
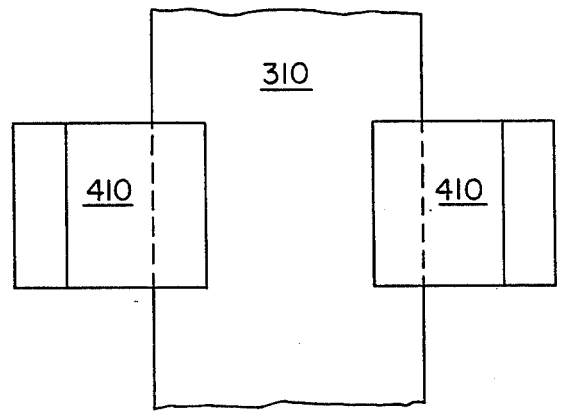

The present invention is directed toward a microstructure capable of executing unrestricted and unrestrained motion in one or more degrees of freedom and is generally referred to as a microactuator.

Applicants have found that higher electric fields are made possible by air gaps made on the order of about one micrometer and by smooth electrode surfaces. The ultimate limit to the electric field in micron-wide air gaps is the threshhold for field emission of electrons, approximately 1 GV/m. Typically, field concentration at asperities on the electrode surfaces induces localized field emission at much lower average fields. However, applicants have found that silicon micromachining techniques yield very small gaps and that integrated-circuit technology yields extremely smooth surfaces which enable the upper field limit to be approached.

With higher electric fields, electrostatic energy densities become more favorable in comparison to magnetostatic energy densities. At a field strength of about 100 MV/m, electrostatic energy density becomes comparable to the magnetostatic energy density for a magnetic flux density of 0.5 T. Correspondingly, the torque densities of microactuators based on these energy densities are comparable, unlike conventional macroactuators where MQS is much stronger than EQS actuation. Furthermore, electrostatic excitation is relatively lossless, utilizes planar electrodes compatible with IC processes, and does not require permeable materials. Hence, the advantages of electrostatically driving a microactuator instead of magnetostatically are:

(1) Magnetic materials which are generally not compatible with silicon microfabrication techniques are not needed;

(2) Electrostatic materials (i.e. conducting and insulating films) interface well with the rest of the microstructure;

(3) EQS actuators do not generate heat like MQS actuators because the former use a constant charge whereas the latter use a constant current; and (4) EQS actuators on the micro level have torque/force densities which are approximately equivalent to those of MQS actuators. Thus, the EQS microactuator has several advantages over MQS actuators of prior art, and has the potential of being economically manufactured by the thousands on silicon substrates.

By way of background, the threshold voltage at which an electric field breaks down in a gas is known as the breakdown voltage of a gas. Paschen's law states that the breakdown voltage of a gas in a uniform electric field is a function of the product of pressure and spacing between conducting surfaces. A more general statement of Paschen's law is that the breakdown voltage is a function of the product of the specific gas density and the spacing. It is understood that this applies at a nearly constant temperature. Only extreme temperature variations will cause a change in breakdown voltage, if the gas density remains the same. At constant pressure and for modest temperature variations, the breakdown voltage will vary according to the ideal gas laws.

Paschen's law implies that each breakdown voltage requires a critical number of electron multiplications by ionizing electron collisions with the gas molecule. The critical number of collisions is achieved when the electric field intersects a critical number of molecules independently of their proximity (density). Thus, decreased density of the gas requires proportionately greater spacing between conducting surfaces and vice versa.

FIG. 1 shows the Paschen curve for air at 20° centigrade in a log-log scale. Typically Paschen's law as stated above was only applied to values greater than about 0.005 bar mm. Prior art taught that at very small pressure spacings, below about 0.005 bar mm, one would observe departures from Paschen's law. However, applicants of the present invention have discovered that a new region of operation exists at such small pressure spacings. As shown by the broken line in FIG. 1, the voltage breakdown values of the curve to the left side of about 0.005 bar mm tend to be associated with high electric fields usually greater than about 10 MV/m, and the smaller the pressure spacing the larger the breakdown electric field. Applicants use this region of operation to achieve MQS actuation strengths with EQS microactuators.

Further, the threshhold for these voltage breakdown values is variable depending on the electrode surface condition and fine particle matter in the gas. Surface roughness, oxide films, and floating conducting or semi-conducting particles which reach the electrode surfaces, all have the effect of locally increasing the electric field at the surface. The effect of these electric field concentrations may produce, at higher applied electric fields, emission of electrons from the metal or micro gas discharges. These extra electrons add to those formed by ionizing collisions and other normal secondary ionization processes, and may reduce the corresponding voltage required for breakdown. Therefore, by reducing the level of surface imperfections and particles in the gas, the voltage breakdown values for small pressure spacings of the Paschen curve occur at higher electric fields. Applicants have found that micromachining techniques achieve such perfected surface characteristics and therefore enable higher electric fields to be obtained without voltage breakdown.

At moderate pressures and at spacings between conducting surfaces where surface roughness becomes of significant dimension compared to the mean spacing, the values for voltage breakdown occur at electric fields above about 10 MV/m.

Applicants have applied the foregoing to a capacitor having two connecting parallel plates separated by a micron wide insulting layer of air to create a variable capacitance microactuator. When a voltage V is applied across the two conducting parallel plates, the capacitor has a stored electric energy U equal to $$U = -\frac{\epsilon_r \epsilon_o w L V^2}{2d}$$

where $\epsilon_o$ and $\epsilon_r$ are the free space and relative permitivities of air, w is the width of the area in which the plates overlap, L is the length of the area of plate overlap, and d is the separation between the two plates. Forces generated in each of the three directions (w, L, d) are given by the negative partial derivative of the stored electric energy U in the respective direction. Hence, the forces in the w, L, and d directions are:

$$F_w = -\frac{\partial U}{\partial W} = \tfrac{1}{2}\frac{\epsilon_r \epsilon_o L V^2}{d} = \frac{\epsilon_r \epsilon_o L d E^2}{2}$$

$$F_L = -\frac{\partial U}{\partial L} = \tfrac{1}{2}\frac{\epsilon_r \epsilon_o w V^2}{d} = \frac{\epsilon_r \epsilon_o w d E^2}{2}$$

$$F_d = -\frac{\partial U}{\partial d} = -\tfrac{1}{2}\frac{\epsilon_r \epsilon_o w L V^2}{d^2} = -\frac{\epsilon_r \epsilon_o w L E^2}{2}$$

where electric field intensity $E = V/d$ and where $F_w$ is a centering force, $F_L$ is a lateral motive force and $F_d$ is a levitating force in a direction normal to lateral movement of the plates.

According to the foregoing equations, when the two parallel plates are misaligned, forces $F_w$ and $F_L$ are formed parallel to the plates tending to realign the plates. Further, the forces depend upon the square of the electric field intensity which is equal to the square of the ratio of applied voltage V to plate separation d. Thus, the stronger the electric field intensity, the stronger is the realigning force and the faster the plates are moved to become aligned. Said another way, the smaller the plate separation d, the larger are the realigning forces and generated torques of the system, for a constant voltage V.

In the present invention, one of the parallel conducting plates is a stator or a part thereof and the other parallel conducting plate is a moving member such as a rotor and the like or a part thereof. The term "rotor" as used herein generally implies a disk-like rotating part of a microactuator. However, no limitations of shape are to be interpreted by the use of such term. Further, moving members of other shapes are suitable for the present invention. The moving member is positioned across a small gap from the stator. The distance between the moving member and stator across the gap is on the order of about one micrometer. The moving member and stator have very smooth surfaces.

According to the Paschen curve for air, an electric potential of about 100 V can be supported across the gap at atmospheric pressure and room temperature (20°-25° C.). At such a high electric field, strong alignment forces in the w and L direction are generated which move the moving member to be aligned with the stator. Similarly, if a series of stator segments and a series of moving member segments are charged in sequence, then the moving member is moved about laterally with respect to the stator to become aligned with the stator at each corresponding segment. If the moving member is a rotor and the stator is positioned about the outer or an inner circumference of the rotor, a sequential charging of the rotor and stator segments causes rapid rotation of the rotor.

Such electrostatic forces are made possible by the small gap and smooth surfaces of the stator and moving member which are formed by micromachining techniques to be described.

Furthermore, as previously stated, the alignment forces and torques produced are a function of the square of the inverse of the small gap distance. Hence, with smaller gap sizes, larger torques and forces are produced.

FIGS. 2a through 4b illustrate various microactuators which have moving members positioned within stators embodying the present invention. The embodiment shown in FIGS. 2a and 2b comprises a laterally moving plate 31 within stator bracket 41. Moving plate 31 is about 1 micrometer thick and is levitated about 1 micrometer above stator substrate 42 and about 1 micrometer below stator bracket 41. As shown in FIG. 2b, moving plate 31 is shorter than or alternatively about the same length as stator bracket 41. The moving plate may however be much larger than the stator as shown by plate 310 and 410 in FIG. 2c.

Moving plate 31 is driven by an electrostatic field generated between electrodes 18 of stator bracket 41 and stator substrate 42 and electrodes 12 on each side of plate 31 which are about 1 micrometer apart from stator electrodes 18 across gap 11. The electrodes are charged in sequence such that plate 31 slides within stator bracket 41 by realignment forces $F_L$ and $F_w$. Realignment force $F_d$ levitates plate 31 above the stator substrate 42. The embodiment shown in FIGS. 3a and 3b comprises a rotor 20 and a centrally positioned stator bracket 21. The rotor 20 has a radius of about 300 micrometers, and stator bracket 21 has a radius overlapping the rotor by about 150 micrometers. Rotor 20 is about 1 micrometer thick. Rotor electrodes 15 are attached to the surface of each side of rotor 20, from the center of rotor 20 to just beneath the outer edge 99 of the stator bracket 21 which overlaps rotor 20. Stator electrodes 16 are attached above rotor 20 and to stator substrate 24 below rotor 20. An electrostatic field is generated between the rotor electrodes 15 and stator electrodes 16 across micrometer wide gap 63 between the stator bracket 21 and rotor 20 and stator substrate 24 and rotor 20. The electric field generates the alignment forces between stator bracket 21 and rotor 20 which causes the rotor to rotate about stator 21 and to be levitated about equidistant between stator 21 and the substrate 24.

Figure 3A:
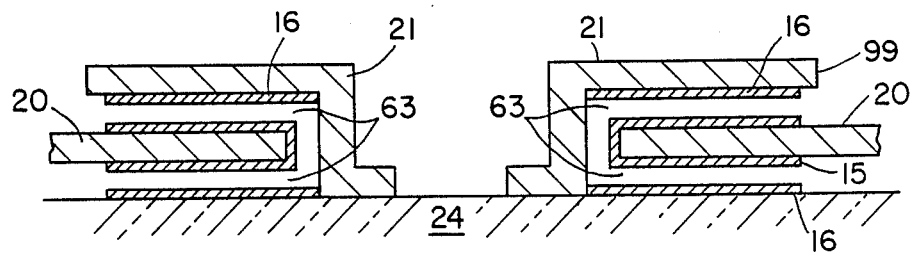
FIGS. 3a and 3b are a cross section and plan view respectively of a microactuator having a center bearing and exposed rotor edge.
Figure 3B:
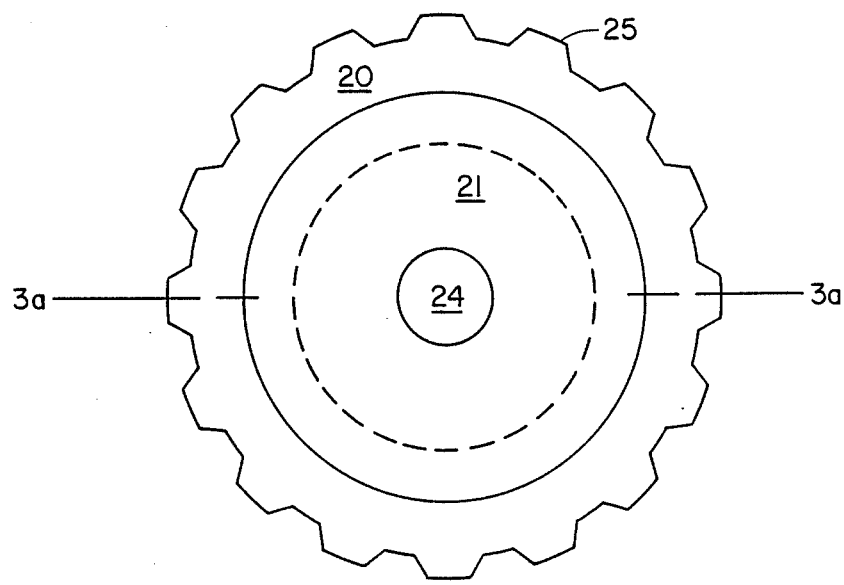

As shown in the plan view of FIG. 3b, the centrally positioned stator bracket 21 leaves the outer edge 25 of rotor 20 exposed. This enables possible gear connections or shutters or the like to be associated with the exposed edge and in turn enables the microactuator to drive structures and systems commonly driven by motors on the macrolevel.

Variable Capacitance Motor

Figure 4A:
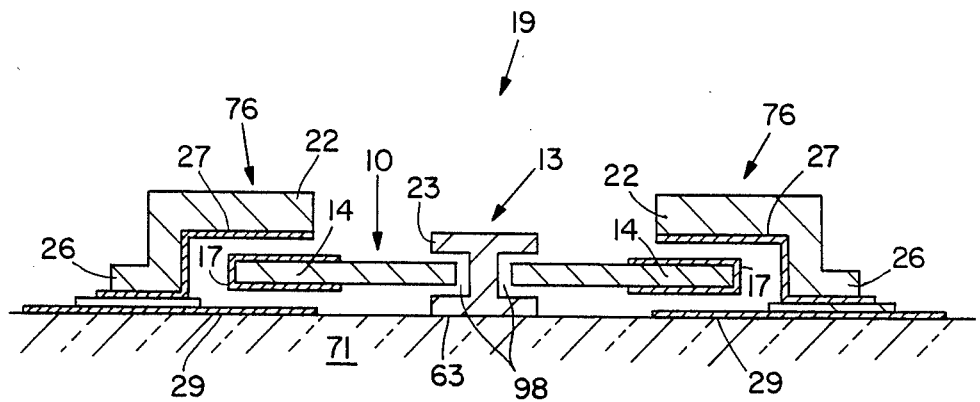
FIGS. 4a and 4b are a cross section and plan view respectively, of a microactuator with a stator about the outer circumference of the rotor.
Figure 4B:
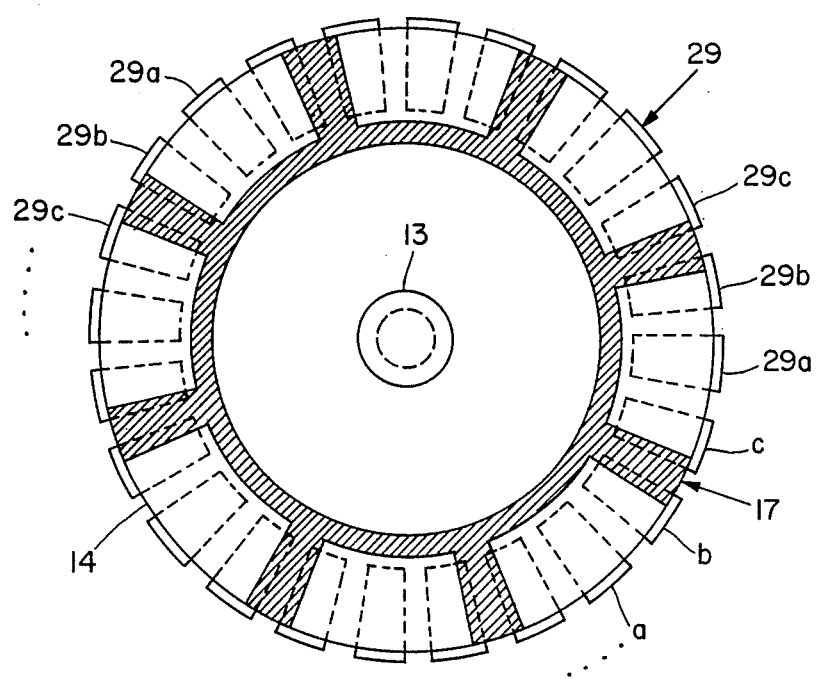

An illustration of a three-phase variable capacitance micromotor 19 which embodies the present invention is provided in FIGS. 4a and 4b. A rotor 10 is positioned about center bearing 13. Bearing 13 is centrally positioned in an opening in the center of rotor 10 and is attached to substrate 71 just beneath the center of the rotor 10. A very small gap 98 is formed between bearing 13 and rotor 10. The gap 98 is so small (about 1 micrometer wide) that air within the gap behaves in a viscous manner. The viscous air acts as a lubricant about the bearing 13.

Stator bracket 76 is positioned about the perimeter of rotor 10. Stator bracket 76 is attached to substrate 71 by support end 26 and overhangs perimeter end 14 of rotor 10 at upper stator end 22.

Radial stability of the rotor 10 is addressed through the self-aligned fabrication of bearing 13 and symmetric fabrication of the rotor 10, to be discussed later. The rotor 10 is also coated with silicon nitride to increase its rigidity.

Vertical stability of rotor 10 is controlled by upper stator electrodes 27 and lower stator electrodes 29. Upper stator electrodes 27 are held by upper stator end 22 of stator bracket 76. Lower stator electrodes 29 are deposited on or diffused into substrate 71. Upper stator electrodes 27 are vertically aligned with lower stator electrodes 29. Rotor electrodes 17 are attached to the top and bottom surfaces of rotor 10 about the perimeter end 14 of the rotor between upper and lower stator electrodes 27 and 29. Rotor electrodes 17 are positioned to form salient segments or fingers which extend radially inward from the perimeter end 14 of rotor 10 to just past the overhanging upper stator end 22. The charge on upper stator electrodes 27 attract rotor electrodes 17 on the top surface of rotor 10 while the charge on lower stator electrodes 29 equally attract rotor electrodes 17 on the bottom surface of rotor 10. The net force in the vertical direction is thus about zero; and the rotor 10 is suspended within stator bracket 76 between substrate 71 and top piece 23 of bearing 13 which overhangs the center of rotor 10.

The rotor 10 has a radius of about 300 micrometers and a thickness of about 1 micrometer. Rotor 10 is suspended about equidistant between stator bracket 76 and substrate 71 at about 1 micrometer. Stator bracket 76 extends over rotor 10 to within a radius of about 200 micrometers from the center of rotor 10.

FIG. 4b shows only 8 poles. A three phase scheme of 60 poles is used to drive rotor 10 about bearing 13. A different number of poles may also be used; 60 poles are used by way of illustration and not limitation. The sixty poles are defined by pairs of stator electrodes, 1 pair member being a lower stator electrode 29 and the other pair member being an upper stator electrode 27. One third of the pairs of stator electrodes are of the first phase. A second third of the pairs of stator electrodes are of the second phase, and the last third of the pairs of stator electrodes are of the third phase. The like phased pairs of stator electrodes are positioned at every third pair of stator electrodes about the circumference of rotor 10. A partial plan view in FIG. 4b illustrates the even placement of like phased pairs of stator electrodes where the labels "a", "b", and "c" indicate the phase of the respective electrodes. The upper stator electrodes 27 are not shown in FIG. 4b for clarity but it is understood that those electrodes 27 are directly matching the stator electrodes 29 shown only set in a plane outside of the paper. In the same light, a reference to pairs of stator electrodes 29a, 29b, and 29c are to be interpreted as those pairs of an upper 27 and a lower 29 stator electrodes of phase "a", "b", and "c" respectively.

Pairs of stator electrodes of one phase 29a are charged such that their capacitance creates an electric field about neighboring salient segments of rotor electrodes 17 at perimeter end 14 of rotor 10. The electric field causes the salient segments of rotor electrodes 17 with one charge to be attracted to the one phase pair of stator electrodes 29a having an opposite charge to that of the rotor electrodes. This attraction occurs at all positions of the one phase charged pairs of stator electrodes around the circumference of rotor 10. The attractive force created causes the rotor 10 to rotate to align the salient segments of rotor electrodes 17 with the currently charged one-phase pairs of stator electrodes 29a. The pairs of stator electrodes of the second phase 29b are charged next, the pairs of electrodes of the second phase 29b being adjacent to the pairs of electrodes of the first phase 29a. A similar electric field is created about salient segments of rotor electrodes 17 at the perimeter end 14 of rotor 10. The rotor electrodes 17 are attracted to the pairs of stator electrodes of the second phase 29b having charges opposite the charge of the rotor electrodes 17. The rotor 10 again rotates to align electrodes 17 with stator electrodes 29b. In turn, the pairs of stator electrodes of phase three 29c are charged and partially rotate rotor 10 in a similar fashion. The three phases are activated in a timed sequence so as to cause a smooth rotation of rotor 10.

Said another way, the salient segments of rotor electrodes 17 are charged in spatial phase with the pairs of charged stator electrodes 29a, 29b, 29c, and thereby define the poles of rotor 10. It follows that rotor 10 must be a good insulator.

The synchronous charging of each phase is accomplished through an element which senses the position of the rotor electrodes 17 with respect to the pairs of stator electrodes 29 and 27 of a certain phase. One such sensing element is a capacitance sensing pad which provides an indication of when rotor 10 passes a certain position relative to certain pairs of stator electrodes 29 and 27. The pairs of stator electrodes next in sequence are then charged through an electronic switching device which works in cooperation with the capacitance sensing pad.

It is appreciated that other sensing means and circuitry can be used to sense the position of the rotor enabling a synchronous charging of the pairs of stator electrodes of the different phases.

Figure 5:
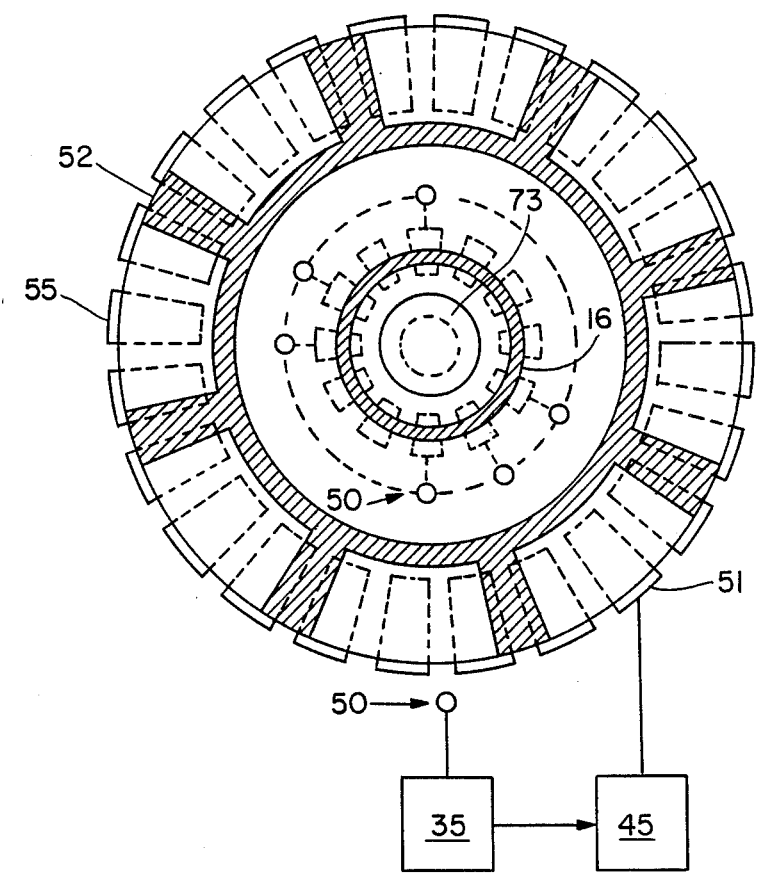
FIG. 5 is a schematic of a microactuator with an electrical circuit for levitation.

An alternative feature of the motor 19 of FIGS. 4a and 4b which may be used to aid in levitating the rotor is shown in FIG. 5. A series of sense elements 50 are connected to a sense circuit 35 for detecting the levitation position of rotor 52 relative to both upper and lower parts of stator 55. The series of sense elements 50 are evenly spaced around center bearing 73 and are positioned below a rotor electrode layer 16 which is incorporated into a central part of rotor 52. Each sense element 50 provides sense circuit 35 with a measure of the capacitance between one side of rotor 52 and the part of stator 55 which lies under rotor 52. The sense circuit 35 provides the stabilizing circuit 45 with an indication of vertical position of rotor 52 by the differential capacitance between the measured capacitances.

A difference in capacitance between sense elements 50 at different locations about rotor 52 indicates the rotor 52 tilting out of parallel with stator 55. A like change in the difference in capacitance between sense elements 50 at different locations about rotor 52 indicates a level rotor 52 moving toward or away from stator 55 in a plane parallel to stator 55. Stabilizing circuit 45 controls the voltage difference between various pairs of upper and lower stator electrodes 51 to correct the relative vertical position of rotor 52 by increasing voltage on the stator 55 where a decrease in capacitance is measured signifying the rotor moving away from stator 55, and by decreasing voltage on the stator 55 where an increase in capacitance is measured signifying rotor 52 moving closer to stator 55.

The sense plate 50 may alternately employ mechanical, optical or electrical, etc. sensing schemes other than the differential capacitance scheme shown. The levitation scheme only needs to measure the position of rotor 52 with respect to stator 55, and to actuate the necessary change in electrode voltages of respective stator and/or rotor electrodes.

Another design to aid in the levitation and vertical stability of the moving rotor involves the shaping of the rotor. The rotor is shaped to comprise spokes or arms. Each spoke is aerodynamically shaped to allow greater levitation. With or without the active levitation feature, a mechanical feature aids in preventing the rotor from collapsing into the substrate. This mechanical feature is the base of the center bearing 13 of FIG. 4a or a bushing 63. Similarly, a series of bushings may be positioned under an inner circumference of the rotor to maintain separation between the rotor and substrate.

Motor Using Brushes

Another embodiment of the invention is shown in FIGS. 6a-6d. In this embodiment, the synchronous charging of each phase is accomplished through a set of brushes 30. In a sense, micromotor 62 of FIGS. 6a-6d is a mechanically switched variable capacitance motor whereas the micromotor 19 of FIGS. 4a and 4b is an electrically switched variable capacitance motor. However, due to existing convention, the micromoter 62 is generally referred to as an EQS micromotor with brushes 30 instead of as a variable capacitance motor. Furthermore, micromotor 62 is an analog of the so-called "MQS dc motor".

Figure 6A:
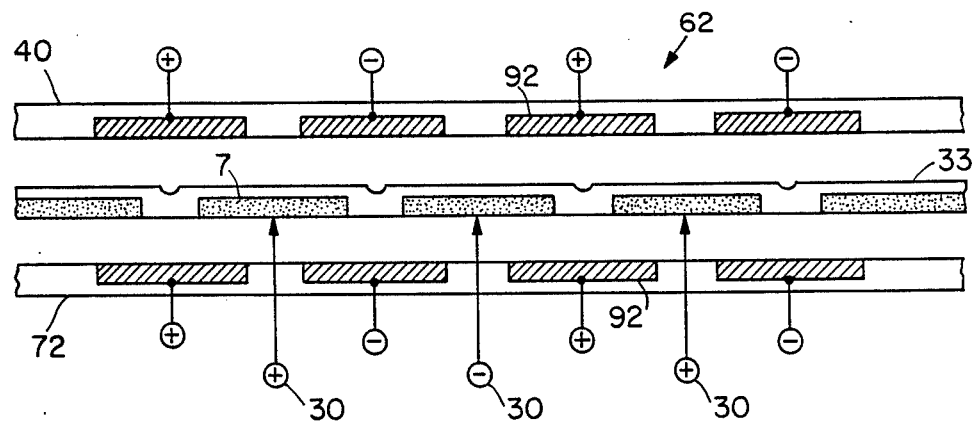
FIGS. 6a-6d are side and plan views of a microactuator with brushes for inducing rotor movement.

In a two phase scheme, brushes 30 are positioned under electrode sections 7 of rotor 33 outside of the region of the stator electrodes 92 of upper and lower stators 40 and 72, respectively as shown in FIG. 6a. As the rotor electrode 7 passes by a brush 30, it is charged opposite to the charge of the receiving pair of stator electrodes 92 which have static dc charges. Every other pair of stator electrodes 92 have a positive charge and the other pairs have a negative charge. This generates an electric field and thereby an alignment force between the oppositely charged rotor electrode 7 and receiving pair of stator electrodes 92 which causes rotation of the rotor 33.

Figure 6B:
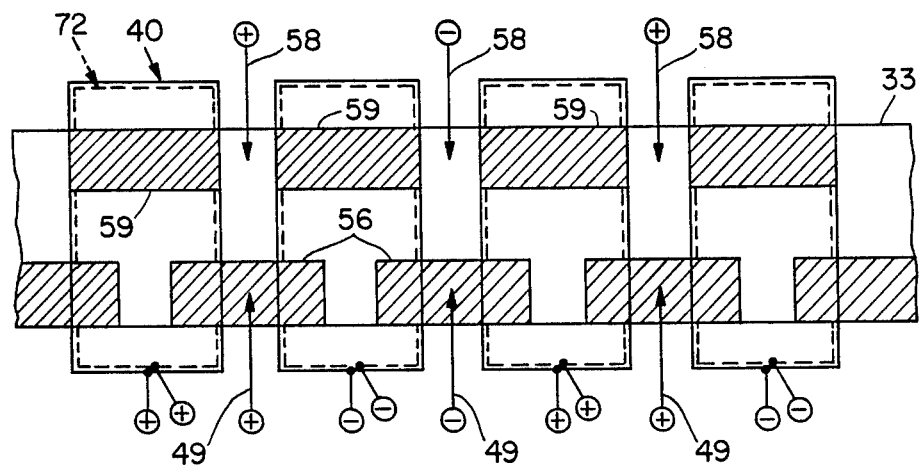

This placement of the brushes ensures that there is almost always a torque tending to rotate the rotor 33. In the design of FIG. 6a when the rotor electrodes 7 are directly aligned with the stator electrodes 92, the brushes 30 do not make contact with the rotor electrodes 7 and hence there is no torque. Split or dual rotor electrodes which are staggered in a 4 phase scheme eliminate this problem as shown in FIG. 6b. In the dual rotor layout there are no dead zones of torque after brushes 49 disconnect from one rotor electrode 56 and before they connect to the next rotor electrode. Brushes 58 matching in sign with respective brushes 49 but of a different phase make contact with rotor electrodes 59 which are staggered between rotor electrodes 56. Some part of the rotor is thus always excited, and hence there is always a rotational torque.

Figure 6C:
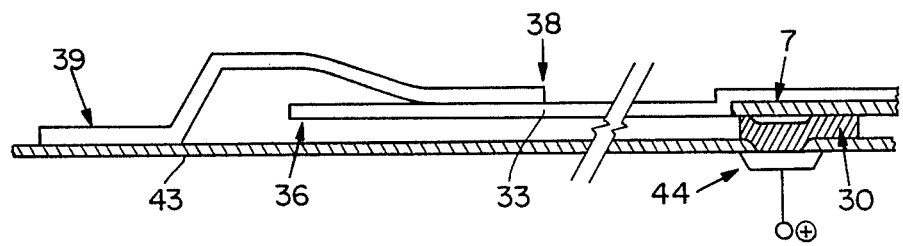
Figure 6D:
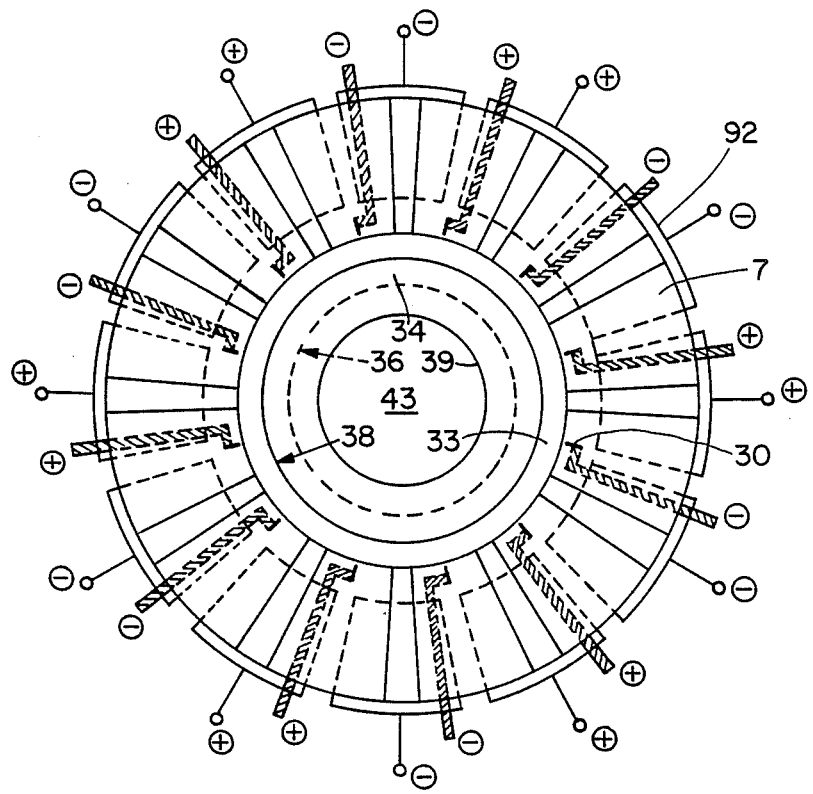

As shown in FIGS. 6c and 6d a spring bearing 34 is necessary to ensure frictional contact between brushes 30 and rotor electrodes 7. An outer edge of the spring bearing 34, presses downward near inner edge 36 of the rotor 33 such that the rotor electrode 7 on an opposite edge of the rotor makes contact with brush 30. An inner edge 39 of the spring bearing is attached to the substrate 43. A plan view with the upper stator electrodes in a plane outside of the drawing is shown in FIG. 6d. In order to minimize friction between the spring bearing 34 and rotor 33, the contact area may be reduced by the spring bearing having a plurality of arms instead of being one continuous surface 34 as shown in FIG. 6d.

No on-chip electronics are needed for brushes 30. The electrical connections 44 are diffused into the substrate 43 as shown in FIG. 6c. The electrical connections 44 supply dc charges to the brushes 30 with every other brush being of one charge and the other brushes being oppositely charged.

MQS Analog Motors: Induction and Permanent Electret

It is known that each magnetoquasistatic actuator has an electroquasistatic analog. Field theory suggests that a duality exists between electrostatic and magnetostatic motors. Circuit theory is used to develop a generalized electrostatic-machine theory as a dual of the generalized magnetic-machine theory. See Layland, M. W. "Generalized Electrostatic-Machine Theory", Proc. IEE Vol. 116 No. 3, March 1969. The foregoing variable capacitance motor of FIGS. 4a and 4b is an analog of a variable reluctance driven magnetostatic motor. With such analogs available, it is appreciated that many different schemes for electrostatically driving the rotor of the present invention are possible.

For example, an analog of an MQS induction motor would have charges induced on a non-salient rotor. The stator is made to switch charges which creates a current across the air gap in the stator. This current induces charges in the rotor to move. In addition, the EQS induction micromotor may employ the levitation schemes previously discussed for the electrically switched variable capacitance motor of FIGS. 4a and 4b.

Another example is an analog to the permanent magnet motor called a permanent electret motor. In such a motor, the rotor comprises a series of permanently positioned charges. Different parts of the stator are made to sequentially switch in charge to attract the charges of the rotor. To optimize torque and rotation of the rotor a position sensor may be employed. One such sensor comprises electrodes which measures the capacitance to indicate the position of the rotor relative to a certain phase of the drive scheme.

General Drive for Electronic Switching

Applicants have concluded that the drive circuitry of the microactuator should be efficient and capable of high speed actuation of the rotor if it is not to limit the actuator's performance. Also, the drive circuit and any sensing element must be integrable in order to produce a one-chip design of the microactuator which is desirable but not critical to the present invention.

If the microactuator were to be used as a static machine that would infrequently change position, its drive could be accomplished with highly dissipative techniques. Since this is not always the case, however, it is important to use efficient power electronic drive techniques. For traditional high-performance motor systems, the power circuit is often the largest and most expensive element of the motor system. In the past, compromises that reduce the size of the power circuit usually result in reduced motor performance. This is also the case with the present microactuator.

Since the microactuator drive is electrostatic rather than magnetostatic, the power circuit design topology is the dual of a normal drive. Instead of converting a dc input voltage into the ac voltage waveforms required across inductive motor windings, the electrostatic micromotor power circuit converts a dc input current into the ac current waveforms required for charging the actuator's capacitive stator electrodes.

FIG. 7 is a schematic of such a simple electrostatic motor drive circuit used to supply the power to stator electrodes of one phase. The circuit 68 includes a dc current source 53 and two active device transistors or controllable switches 54 and 57. The transistors 54 and 57 must be electrostatically isolated because their respective voltages are potentially high. Transistor 54 also requires an isolated drive circuit 5 with voltage supplies 46 and control logic 48. Voltage supplies 46 are each 5 V to 10 V. Drive circuit 9 of transistor 57 is similar to drive circuit 5 and is similarly powered by a voltage supply of about 5 V to 10 V. When drive circuits 5 and 9 close transistors 54 and 57 respectively, current from source 53 flows through transistor 54, through phase capacitor 40 negative plate 8 side first and through transistor 57. This flow of current discharges the stator electrodes of the one phase connected to the circuit 68 at capacitor plates 3 and 8. When drive circuits 5 and 9 open transistors 54 and 57 respectively, current flows from source 53, through diode 64 through phase capacitor 40 positive plate 3 side first and through diode 66. This flow of current charges the stator electrodes of the one phase connected to the circuit 68 at phase capacitor plates 3 and 8.

The isolated power devices and the possibly high-voltage operation are an obstacle to a one-chip integrated design of the microactuator system. However, the techniques needed to integrate isolated power devices are now being pursued for development of high-voltage integrated circuits and "smart power" circuits (See "Approaches to Isolation in High Voltage Integrated Circuits", by H. Becke, IEEE Internation Electron Devices Meeting, Washington, D.C. 724–727, December 1985).

Perhaps the most challenging problem in the drive circuit design is the need to keep the charge equal on the upper and lower capacitor plate 3 and 8. Normally, such control is achieved by simply supplying the required charge and opening the terminals. However, the microactuator's drive capacitances can easily be smaller than the junction capacitance of the power circuit's switches. The result is that the switches do not appear as infinite impedances when in the off state. An active control of the phase capacitor charge is therefore required. In an integrated power circuit, this problem is less severe and consequently, the performance of a one-chip microactuator system may be superior.

The embodiment of FIGS. 4a and 4b can also be driven by a 4 or more phase variable capacitance scheme. The same attraction of the rotor electrodes 17 in FIGS. 4a and 4b to like pairs of stator electrodes 29 would occur through the electric field generated at the outer edge 14 of rotor 10. The synchronous charging of the different phased pairs of electrodes would similarly be required for smooth rotation of the rotor. A two-phase scheme would also be similar but limited to rotate rotor 10 in only one direction due to the spatial relationship of the different poles. Because there are only two phases, the stator electrodes of like phase are positioned at every other electrode around the circumference of the rotor. The rotor electrodes are thus attracted on opposite sides to electrodes of like phase. Hence, the rotor can experience no net rotational force and does not rotate unless an asymmetry is introduced that usually results in the rotor being able to only rotate in one direction.

The micromotor 19 of FIGS. 4a and 4b driven by the three-phase variable capacitance scheme rotates at about 2.4 million rpm and has a velocity of about 70 mps. It has a mechanical settling time of less than 100 microseconds and an angular acceleration of about $4 \times 10^9$ radians per second$^2$. Such performance is achieved by an electric field of about 100 MV/m leaving possibility of greater performance at higher electric fields.

Micromotor Fabrication Process

The rotor 10 within self aligned bearing 13 of FIGS. 4a and 4b is fabricated by surface micromachining techniques illustrated in FIGS. 8a–8e. Although the illustrated method of fabrication is particular to the use of silicon technology, it is understood that other materials and respective techniques are suitable. Bearing fabrication optionally begins in FIG. 8a with a patterning of bushing layer 81 over substrate 71 that offsets the rotor 10 of FIGS. 4a and 4b from the substrate 71. The first sacrificial layer 65 is deposited over bushing layer 81 and then planarized using a conventional plasma-etching technique. Planarization of the layer 65 avoids a nested step in the rotor 10 of FIGS. 4a and 4b over the bushing 81 that could allow the rotor 10 to rest on the substrate 71 after etching of the sacrificial layer 65. A rotor layer 61 is deposited over the first sacrificial layer 65. A second sacrificial layer 60 is deposited over the rotor layer 61 before the rotor is patterned to shape. The patterning step also defines the perimeter of the rotor. A circular window 86 is etched through to the substrate 71, preferably by means of successive dry etching steps, as shown in FIG. 8b.

Deposition of a third sacrificial layer 85 then defines the gap 75 between the center bearing 13 and the rotor 10 as shown in FIGS. 8c and 8e. The circular window 86 must be etched as a true circle to within the thickness of the gap 75 defined by the third sacrificial layer 85, if the rotor is to turn freely. It is also critical in the rotor etching step to minimize the eccentricity of the rotor in order to suppress rotational instability.

A window 69 is cut through the third sacrificial layer 85 to the substrate 71 in the center of the bearing area as shown in FIG. 8c. An essential point of the self-aligned bearing process is that the alignment between circular window 86 and window 69 is not critical. The bearing 13 is attached to substrate 71 through window 69 by a bearing layer 47 being deposited over the third sacrificial layer 85 as shown in FIG. 8d. The bearing layer 47 is also patterned to form the upper stator electrode structure 76 like that of FIGS. 4a and 4b at the perimeter of the rotor. The silicon wafer 6 is immersed in a selective etchant which removes sacrificial layers 65, 60, and 85, freeing the rotor 10 which is shown resting on bushing 81 in FIG. 8e with gap 75 in place of the third sacrificial layer 85.

The electrodes for the variable capacitance scheme or other circuitry for drive and sensing schemes are readily incorporated into the microfabrication process. The lower stator electrodes 29 of FIGS. 4a and 4b are diffused into the substrate 71 before any other layers are deposited onto the substrate. The rotor electrodes 17 are deposited before and after the rotor layer 61 is deposited. The rotor electrodes 17 then become attached on the top and bottom surface of rotor 10. The electrodes 17 are deposited so as to be positioned only at the outer end 14 of rotor 10. Alternatively, the rotor electrodes 17 can be encapsulated as a single layer deposited and patterned on an insulating structural layer. A second insulating layer is then deposited and patterned to complete the rotor 10.

The upper stator electrodes 27 are deposited and patterned on the outer edge of the third sacrificial layer 85 before bearing layer 47 is deposited. The stator electrodes 27 are deposited so as to become connected to upper stator electrode structure 76 at the predetermined radius from the rotor center and aligned above the substrate lower stator electrodes 29. Brushes 30, 34, or sensing elements are fabricated during deposition of bushing layer 81 or bearing layer 47 depending upon the respective design of the brushes or sensing scheme.

Macroscopic motion of the rotor introduces new criteria for material selection. Bearing surfaces must be resistant to wear and have low friction coefficients. Silicon nitride is one option for coating the bearing, bushing, and rotor since it is a standard electronic material that is also used for coating high speed bearings. Moreover, silicon nitride films exhibit negligible wear when subjected to severe stylus abrasion in a silicon rotating disk memory device. See "Rotating NMOS Memory Disk", by S. Iwamura, Y. Nishida, and K. Hashimoto, *IEEE Trans. on Electron Devices*, Vol. ED-28, 854–860, July 1981. Use of a silicon nitride for a wear-resistant coating in the micromotor makes a doped oxide film such as phosphosilicate glass attractive as the sacrificial layers. Such an oxide film etches very rapidly in buffered hydrofluric acid (HF) relative to silicon nitride. In principle, the only requirement for micromachining free-standing composite structures incorporating several materials is the availability of an etchant with a high etch ratio between the sacrificial and structural layers. Thus, other materials may be satisfactory.

Thin-film stress is a second important concern in fabricating the micromotor. Built-in stress in thin films is due to mismatches of thermal expansion coefficients between the film and silicon substrate and from the mechanism of grain growth. The average stress and its variation through the thickness of the freestanding microstructure must be controlled to avoid buckling or warpage. For example, poly-Si cantilevers are statically deflected due to the variation of intrinsic stress with depth in the poly-Si film. In the case of the rotor 10 for the electrostatic micromotor 19, the control of stress is more demanding because the rotor is a composite of dielectric and conducting films. Needless to say, any warpage of the rotor would make its stabilization and control more difficult.

As previously noted, electrostatic and magnetostatic motors are linked through the duality of their operation. In principal, a variety of electrostatic microactuator topologies can be derived by translating the many traditional magnetostatic motors through the duality relations. However, this translation is constrained by microfabrication tolerances and the electrical properties of the microelectronic materials. The stability and control of the resulting micromotor is also a limitation.

The design for each microactuator topology must combine the three dimensional rotational and translational mechanics of the rotor with the aerodynamic and electromechanic phenomena which act on the rotor. Of particular interest are the aerodynamic phenomena, because the maximum tip speeds of the armature are large yet the Reynolds number of the air flow in the gap is small enough for Stokes-flow approximation to be valid. As a result, surface irregularities in the gap (due to steps at the stator electrodes, for example) will affect the drag on the motor. Furthermore, the compressibility of the air or other gas in the gap will also become important.

Given the high frequencies of the micromotors, self-stabilization is obviously desirable where possible. Applicant has designed both the rotor and bearing upon an analysis of air flow in micron wide gaps. In another design of the rotor, spokes are etched in the rotor to minimize its rotational moment of inertia making it possible to use the flow around the spokes to enhance stability. One application of a spoked rotor is in an optical modulator shown in FIGS. 9a and 9b.

Microactuator Applications

Figure 9A:
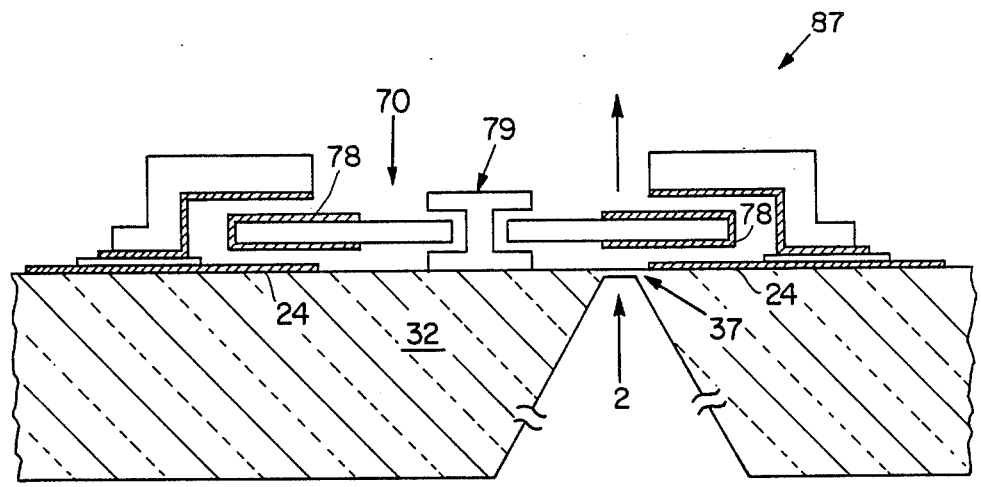
FIGS. 9a and 9b are a cross section and a plan view respectively of an optic modulator embodying the present invention.
Figure 9B:
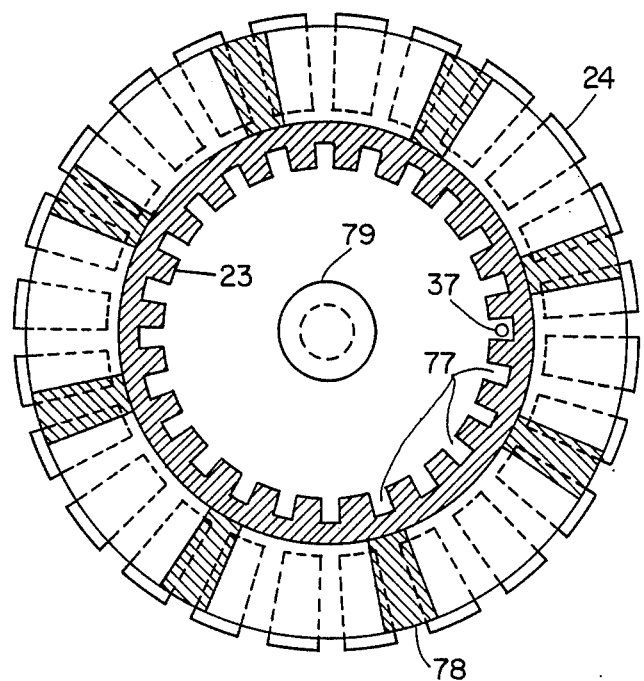

An electromechanical optical modulator 87 can be fabricated by micromachining a transparent diaphragm 37 in the substrate 32 underneath a portion of the rotor 70. Light from a light source 2 is chopped by alternating opaque 23 and transparent 77 regions in the rotor 70 as shown in FIG. 9b. Silicon-rich silicon nitride is attractive as a material for the transparent diaphragm 37 and rotor 70. Opaque regions 23 can be defined in the rotor 70 by depositing and patterning of a metal film, which could be identical to the rotor electrodes 78. Conventional silicon micromachining is used to fabricate the diaphragm 37. By extending the rotor electrodes 78 to a radius less than the stator electrodes 24 and using a 10 micrometer diameter diaphragm 37 located as shown in FIGS. 9a and 9b, a maximum chopping frequency of about 2.4 MHz is obtained with all other dimensions and specifications like those of micromotor 19 in FIGS. 4a and 4b. The small diameter of the diaphragm 37 requires either a highly focussed beam or mounting of the light source, such as a laser diode, in close proximity to the diaphragm 37. Higher chopping frequencies can be obtained by increasing the radius of the rotor or increasing the rotation rate of the rotor. The latter goal can be pursued by operation of the micromotor in vacuum for elimination of viscous drag. In that case, however, no lubrication would be generated about the bearing 79 due to lack of any gas between the bearing and rotor.

A second commercial application is use of the micromotor of FIG. 5 as a gyroscope. In this case, active stabilization of the rotor provides the means for detecting the torques exerted on the rotor due to changing substrate orientation. Active stabilization of the axial position of the rotor is accomplished through separate control of the drive charge applied to the upper and lower stator electrodes at low bandwidths relative to the frequency of rotation. One such active stabilization scheme is the levitation scheme of FIG. 5, or one similar to that. Equal charges are nominally maintained between the upper and lower stator electrodes since any charge imbalance will shift the axial position of the rotor and cause instability. The degree of charge imbalance required to counteract the applied torque is a sensitive probe of angular acceleration.

Figure 10:
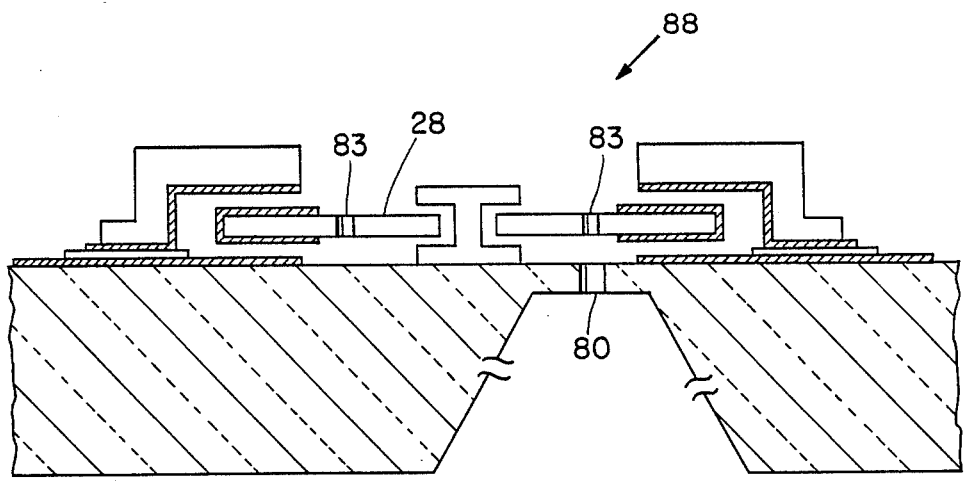
FIG. 10 is a cross section of an air pump embodying the present invention.

The micromotor 19 can also be used as an air pump 88 by micromachining an aperture 80 underlying the rotor 28 and apertures 83 at a corresponding radius in the rotor as shown in FIG. 10. Under Bernoulli's principle, the pressure of moving air is less than the pressure of still air. Hence, a differential pressure arises from the velocity of air at the rotor surface being greater than the velocity of air at the substrate when the rotor is in motion. In turn, this creates a suction of air from apertures 80 through the apertures 83 in the rapidly spinning rotor. This embodiment uses the drive scheme of the embodiment of FIG. 4 or a similar drive scheme.

Figure 11:
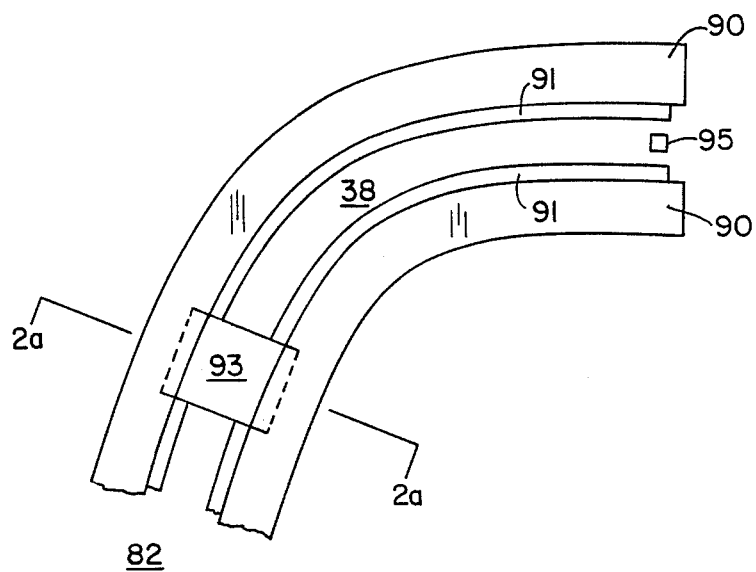
FIG. 11 is a plan view of a track and shutter system embodying the present invention.

In another embodiment shown in FIG. 11, the moving member 93 is driven laterally about the surface of the substrate. Upper track 90 and lower track 91 house upper and lower stator electrodes respectively. The lower track 91 may be lower stator electrodes diffused directly into the substrate 82. The design of the upper track 90 is similar to the upper stator electrode structure 41 of FIGS. 2a and 2b and has the same cross section as that shown in FIG. 2a through line 2a—2a of FIG. 2b. The tracks 90 and 91 correspond to each other and pattern a pathway 38 about the surface of substrate 82. Pathway 38 may comprise any number of curves and straightaways. The electrodes are driven by the same three-phase variable capacitance scheme as in the embodiment of FIGS. 4a and 4b except the moving member 93 is pulled laterally along the pathway 38 instead of rotating about an axis in one area. The like phased pairs of upper and lower stator electrodes are positioned adjacent to two different phased pairs of stator electrodes in a line along the tracks 90 and 91 instead of around the circumference of the rotor as in FIGS. 4a and 4b. Tracks 90 and 91 are positioned respectively above and below the opposite side edges of moving member 93. At the end of pathway 39 formed by tracks 9 and 91 is an aperture 95 in substrate 82 positioned just below moving member 93 when the moving member is at the end of tracks 90, 91. With such a design the moving member 93 acts as a shutter over aperture 95. This design is applicable in optic systems and shear stress sensors to name a few.

While this invention has been particularly shown and described with references to preferred embodiments thereof, it will be understood by those skilled in the art that various changes in form and details may be made therein without departing from the spirit and scope of the invention as defined by the appended claims.

We claim:

1. An electrostatic machine comprising:
   a stator formed by surface micromachining sacrificial layers on a substrate surface;
   a moveable member positioned for movement relative to the stator free of contact thereto, the moveable member formed and positioned with respect to the substrate surface during the surface micromachining that formed the stator;
   means for generating and sustaining an electrostatic field about the moveable member across a gaseous gap between the stator and moveable member, facing surfaces of the surface micromachined stator and moveable member across the gaseous gap being free of contact with each other and sufficiently smooth to support a field strength above about $10^8$ V/m without electrostatic breakdown, the distance between the stator and moveable member across the gaseous gap being about 5 micrometers or less.

2. A machine as claimed in claim 1 wherein the moveable member is of a type which is formed within the stator by supporting the moveable member within the stator by a sacrificial layer and then removing the sacrificial layer to free the moveable member.

3. A machine as claimed in claim 1 wherein the stator comprises a bearing for limiting lateral movement of the moveable member, the bearing being of the type which is aligned with the moveable member by the fabrication steps of:
   forming the moveable member;
   covering the moveable member, including an edge thereof, with a sacrificial layer;
   forming the bearing over the sacrificial layer along the edge of the moveable member; and
   removing the sacrificial layer.

4. A machine as claimed in claim 1 wherein the stator includes a series of stator electrode segments on opposite sides of the moveable member, and the moveable member includes a series of member electrode segments, the electrodes of one of the series of electrode segments being charged in sequence to be attracted to the electrodes of the other of the series of electrodes, the attraction toward the electrodes on opposite sides of the moveable member being complementary in a direction of member movement and in opposition in a direction normal to the direction of movement.

5. A machine as claimed in claim 4 wherein the electrodes of the series of member electrode segments are charged in sequence by a series of brushes.

6. A machine as claimed in claim 1 wherein the stator includes a series of stator electrode segments, the electrodes of said series being charged in sequence to induce attracting charge in the movable member.

7. A machine as claimed in claim 1 further comprising means for maintaining separation between the moving member and the stator.

8. A machine as claimed in claim 7 wherein said means include a bushing.

9. A machine as claimed in claim 7 wherein said means includes an electronic circuit for detecting and correcting levitation of the moveable member relative to the stator.

10. A machine as claimed in claim 1 wherein the moveable member is a rotor.

11. A machine as claimed in claim 10 wherein the stator comprises a center bearing for limiting lateral movement of the rotor, the bearing being of the type which is aligned with the rotor by the fabrication step of:
    forming a rotor with a circular opening through a center of the rotor to a substrate beneath the rotor;
    covering the rotor including an edge of the circular opening with a sacrificial layer;
    forming the center bearing over the sacrificial layer along the edge of the circular opening attaching the center bearing to the substrate within the circular opening; and
    removing the sacrificial layer.

12. A machine as claimed in claim 11 wherein the bearing is of the type that is aligned with a rotor formed by the steps of:
    covering the substrate with one sacrificial film;
    depositing a structural film over the one sacrificial film;
    covering the structural film with another sacrificial film; and
    patterning the rotor to said shape by cutting through said another sacrificial film to said substrate.

13. A machine as claimed in claim 10 wherein the stator includes a series of stator electrode segments on each side of the rotor, and the rotor includes a series of rotor electrode segments, the electrodes of the series of rotor electrode segments being charged in sequence by a series of brushes to be attracted to the electrodes of the series of stator electrode segments, the attraction toward the electrodes to each side of the rotor being complementary in a direction of rotor movement and in opposition in a direction normal to the direction of movement.

14. A machine as claimed in claim 13 wherein the stator comprises a bearing for limiting lateral movement of the rotor and for ensuring frictional contact between the rotor electrode segments and the brushes, the bearing being of the type which is aligned with the rotor by the fabrication steps of:
    forming a rotor with a circular opening through a center of the rotor to a substrate beneath the rotor;
    covering the rotor including an edge of the circular opening with a sacrificial layer;
    forming the center bearing over the sacrificial layer along the edge of the circular opening attaching the center bearing to the substrate within the circular opening; and
    removing the sacrificial layer.

15. A machine as claimed in claim 1 wherein the means for generating an electrostatic field generates a field in a manner which elevates the plate and laterally moves the elevated plate.

16. An electrostatic machine comprising:
    a stator formed by surface micromachining sacrificial layers on a substrate surface;
    a plate formed by the surface micromachining that formed the stator on the substrate surface and positioned for movement relative to the stator free of contact thereto and with a gaseous gap between the stator and plate, the distance across the gap between the stator and plate being short enough and facing surfaces of the stator and plate across the gap being smooth enough to support a field strength above about $10^8$ V/m without electrostatic breakdown, the facing surfaces of the stator and plate being free of contact with each other across the gap, and the gap having a pressure-spacing of less than about $5 \times 10^{-3}$ bar mm; and means for generating and sustaining an electrostatic field across the gaseous gap between the stator and plate.

17. An electrostatic machine as claimed in claim 16 wherein said distance across the gap between the stator and the plate is on the order of 1 micrometer or less.

18. A machine as claimed in claim 16 wherein the distance across the gap between the stator and plate causes air within the gap to behave as a viscous fluid such that the air acts as a lubricant between the stator and the plate.

19. A machine as claimed in claim 16 wherein the stator includes a series of stator electrode segments on each side of the plate, and the plate includes a series of plate electrode segments, one of the series of electrode segments being charged in sequence to be attracted to the other of the series of electrodes, the attraction toward the electrodes to each side of the plate being complementary in the direction of plate movement and in opposition in a direction normal to the direction of movement.

20. A machine as claimed in claim 19 further comprising brush means to charge and discharge the series of plate electrode segments.

21. A machine as claimed in claim 19 wherein said series of stator electrode segments are charged in sequence to induce attracting charge in the series of plate electrode segments.

22. A machine as claimed in claim 16 further comprising means for maintaining the position of the plate within the stator.

23. A machine as claimed in claim 22 wherein said means for maintaining plate position include a bushing.

24. A machine as claimed in claim 22 wherein said means for maintaining plate position include an electronic circuit for sensing and correcting a levitation level of the plate relative to the stator.

25. A machine as claimed in claim 16 wherein the means for generating an electrostatic field generates a field in a manner which elevates the plate and laterally moves the elevated plate.

26. An electrostatic machine comprising:

a stator formed on a substrate surface;

a moveable member positioned for movement relative to the stator over the substrate surface in a manner free of contact with the stator, the moveable member formed during the forming of the stator;

means for generating an electrostatic field about the moveable member across a gaseous gap between the stator and moveable member in a manner which elevates the moveable member above the substrate surface and moves the elevated moveable member laterally over the substrate surface, the distance between the stator and moveable member across the gap being about 5 micrometers or less and surfaces of the stator and moveable member facing each other across the gap being free of contact with each other and smooth enough to support a field strength above about $10^8$ V/m without electrostatic breakdown.

27. An electrostatic machine comprising:

a stator formed on a substrate surface;

a plate positioned for movement relative to the stator in a manner free of contact thereto and with a gaseous gap between the stator and plate, the plate formed during the forming of the stator, the distance across the gap between the stator and plate being short enough and surfaces of the stator and plate facing each other across the gap being smooth enough to support a field strength above about $10^8$ V/m without breakdown, the surfaces of the plate and stator facing each other across the gap being free of contact with each other, and the gap having a pressure-spacing less than about $5 \times 10^{-3}$ bar mm; and means for generating an electrostatic field across the gap between the stator and plate such that the plate is elevated above the substrate surface and moved laterally while being elevated.

* * * * *

UNITED STATES PATENT AND TRADEMARK OFFICE
CERTIFICATE OF CORRECTION

PATENT NO. : 4,943,750

DATED : July 24, 1990

INVENTOR(S) : Roger T. Howe, Jeffrey H. Lang, Martin F. Schlecht, Martin A. Schmidt and Stephen D. Senturia It is certified that error appears in the above-identified patent and that said Letters Patent is hereby corrected as shown below:

In Column 18, line 8, (Claim 11, line 4 of that claim), delete "step" and insert ---steps---.

Signed and Sealed this

Twenty-ninth Day of October, 1991

Attest:

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO. : 4,943,750

DATED : July 24, 1990

INVENTOR(S) : Roger T. Howe, Jeffrey H. Lang, Martin F. Schlecht, Martin A. Schmidt, Stephen D. Senturia It is certified that error appears in the above-identified patent and that said Letters Patent is hereby corrected as shown below:

Col. 1, line 6, before the heading BACKGROUND OF THE INVENTION, insert the following:

--This invention was made with government support under Contract No. 8614328-ECS by National Science Foundation. The government has certain rights in the invention.--

Signed and Sealed this

Twelfth Day of April, 1994

Attest:

BRUCE LEHMAN

*Attesting Officer*  Commissioner of Patents and Trademarks